United States Patent
Taniguchi et al.

(10) Patent No.: US 11,332,608 B2
(45) Date of Patent: May 17, 2022

(54) CURABLE EPOXY RESIN COMPOSITION, AND FIBER-REINFORCED COMPOSITE MATERIAL USING SAME

(71) Applicant: NIPPON STEEL CHEMICAL & MATERIAL CO., LTD., Tokyo (JP)

(72) Inventors: Yuichi Taniguchi, Tokyo (JP); Yasuyuki Takao, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 515 days.

(21) Appl. No.: 16/466,856

(22) PCT Filed: Dec. 4, 2017

(86) PCT No.: PCT/JP2017/043500
§ 371 (c)(1),
(2) Date: Jun. 5, 2019

(87) PCT Pub. No.: WO2018/123454
PCT Pub. Date: Jul. 5, 2018

(65) Prior Publication Data
US 2020/0062949 A1   Feb. 27, 2020

(30) Foreign Application Priority Data

Dec. 27, 2016   (JP) ............................. JP2016-254443

(51) Int. Cl.
| C08L 63/04 | (2006.01) |
| C08J 5/04 | (2006.01) |
| C08J 5/24 | (2006.01) |

(52) U.S. Cl.
CPC .............. *C08L 63/04* (2013.01); *C08J 5/04* (2013.01); *C08J 5/24* (2013.01); *C08J 2343/04* (2013.01); *C08J 2363/04* (2013.01); *C08J 2463/02* (2013.01); *C08L 2205/025* (2013.01); *C08L 2205/03* (2013.01); *C08L 2205/035* (2013.01)

(58) Field of Classification Search
CPC .................................. C08L 63/04; C08J 5/05
See application file for complete search history.

(56) References Cited

U.S. PATENT DOCUMENTS

| 2003/0082385 A1 | 5/2003 | Li et al. |
| 2016/0002390 A1 | 1/2016 | Hughes et al. |
| 2016/0297959 A1 | 10/2016 | Ishimoto et al. |
| 2017/0291985 A1 | 10/2017 | Takaiwa et al. |
| 2018/0155489 A1 | 6/2018 | Ushiyama et al. |

FOREIGN PATENT DOCUMENTS

| JP | 06-172495 A | 6/1994 |
| JP | 09-157498 A | 6/1997 |
| JP | 10-182793 A | 7/1998 |
| JP | 3985224 B2 | 10/2007 |
| JP | 2010-195854 A | 9/2010 |
| JP | 2010-248479 A | 11/2010 |
| JP | 2014-185256 A | 10/2014 |
| JP | 2015-209489 A | 11/2015 |
| JP | 2016-504472 A | 2/2016 |
| WO | 2015/083714 A1 | 6/2015 |
| WO | 2016/035459 A1 | 3/2016 |
| WO | 2016/199857 A1 | 12/2016 |

OTHER PUBLICATIONS

English Machine Translation JP H09157498A obtained Jan. 5, 2022 at https://worldwide.espacenet.com/publicationDetails/biblio?DB=EPODOC&II=0&ND=3&adjacent=true&locale=en_EP&FT=D&date=20170622&CC=JP&NR=WO2016199857A1&KC=A1#(Year: 2017).*
International Search Report dated Mar. 6, 2018, issued for PCT/JP2017/043500.
Notification of Transmittal of Translation of the International Preliminary Report on Patentability (Chapter I or Chapter II) dated Jun. 27, 2019, issued for PCT/JP2017/043500.
Translation of International Preliminary Report on Patentability (Chapter I of the Patent Cooperation Treaty) issued for PCT/JP2017/043500.

* cited by examiner

*Primary Examiner* — Arrie L Reuther
(74) *Attorney, Agent, or Firm* — Locke Lord LLP

(57) ABSTRACT

A resin composition for a fiber-reinforced composite material that makes it possible to improve productivity by suppressing deformation at the time of removal from a mold, in particular, in the PCM method, while achieving both rapid curing and storage stability. The resin composition for a fiber-reinforced composite material includes an epoxy resin (A) including a phenol novolac epoxy resin and a bisphenol A epoxy resin; a phenoxy resin (B); dicyandiamide (C); an imidazole-based curing aid (D); and a phenol-based curing accelerator (E) as essential components, wherein the phenol novolac epoxy resin of the epoxy resin (A) constitutes 40 parts by mass to 75 parts by mass, the bisphenol A epoxy resin constitutes 10 parts by mass to 35 parts by mass, and the phenoxy resin (B) constitutes 5 parts by mass to 15 parts by mass in the total of 100 parts by mass of the components (A) to (E).

20 Claims, No Drawings

CURABLE EPOXY RESIN COMPOSITION, AND FIBER-REINFORCED COMPOSITE MATERIAL USING SAME

TECHNICAL FIELD

The present invention pertains to a matrix resin material for a fiber-reinforced composite material, which is a resin composition excellent in rapid curing, low viscosity and viscosity stability over a long period of time and which makes it possible to obtain a molded article having high heat resistance and toughness at the time of curing.

BACKGROUND ART

Fiber-reinforced composite materials are configured of reinforcing fibers such as glass fibers, aramid fibers, carbon fibers and the like and a thermally curable matrix resin such as an unsaturated polyester resin, a vinyl ester resin, an epoxy resin, a phenolic resin, a benzoxazine resin, a cyanate resin, a bismaleimide resin and the like. Since such composite materials are lightweight and excellent in mechanical properties such as strength, corrosion resistance, fatigue resistance and the like, they are widely used as structural materials for aircrafts, automobiles, civil engineering, sporting goods and the like.

Production of a fiber-reinforced composite material can be implemented by a method such as an autoclave molding method using a prepreg obtained by impregnating reinforcing fibers in advance with a thermally curable matrix resin, and a filament winding molding method or a resin transfer molding method including a step of impregnating reinforcing fibers with a liquid matrix resin and a step of molding by thermal curing. Among them, in the autoclave method, a high-quality molded article can be obtained by laminating the prepregs obtained by impregnating the reinforcing fibers in advance with a resin, then reducing pressure to bond the layers together, and pressurizing and heating in an autoclave. However, this method has a disadvantage that the productivity is low because the pressure reduction step and the curing step by the autoclave are long. Accordingly, a prepreg compression molding method (PCM method) by which prepregs laminated in advance are heated and pressurized in a mold to mold and cure a resin and obtain a fiber-reinforced composite material has been developed as a method to improve productivity.

In the PCM method, a prepreg is prepared by pre-impregnating reinforcing fibers such as carbon fibers or the like with a thermosetting resin, which is thermally cured in a short time, and the prepreg is conformed in advance to the shape of a molded article to be pattern cut, laminated, and preformed. Thereafter, the desired fiber-reinforced composite material can be obtained by molding the preform in a short time at high pressure and high temperature by using a high-power hydraulic press.

The various properties required of the prepreg to be used in the PCM method obviously include excellent general mechanical properties, but at the same time, a short curing time at a curing temperature during molding in combination with excellent storage stability in order to facilitate handling. This is because by shortening the curing time, it is possible to improve productivity in a limited production facility.

In the PCM method, a prepreg is impregnated with a resin, and a thermosetting resin is used as the resin. The above-mentioned storage stability and rapid curability are required for the thermosetting resin. Furthermore, it is required that the resin viscosity at the time of curing does not decrease too much. This is because where the resin viscosity is reduced by the temperature at the time of press molding, the smoothness of the molded article surface is improved, but where the viscosity reduction time is long, the resin leaks from the mold and a desired molded article cannot be obtained. In addition, a problem arising when the curing reaction proceeds before the resin viscosity is completely reduced is that the resin does not sufficiently flow to the surface, thereby impairing the smoothness. Therefore, in order to shorten the curing time, it is important to balance resin viscosity and curing speed.

Furthermore, in the PCM method, it is required that the molded article be not deformed when taken out of the mold after press molding. In the PCM method, a molding temperature of 140° C. to 150° C. is used. At this time, when the glass transition temperature of the molded article is lower than the temperature of the mold, the resin is softened, which tends to cause deformation of the molded article at the time of demolding when the molded article is removed from the mold. For this reason, it is important to use a thermosetting resin having a glass transition temperature higher than the molding temperature in order to suppress deformation of the molded article during demolding.

A tensile elongation at break of reinforcing fibers used in fiber-reinforced composite materials generally shows a value 3% to 6% for glass fibers, 2% to 5% for aramid fibers, and 1.5% to 2.0% for carbon fibers. Therefore, from the standpoint of obtaining a fiber-reinforced composite material having excellent strength, it is desirable to use, as the matrix resin, a material having a tensile elongation at break higher than that of the reinforcing fibers.

Heretofore, thermosetting resins such as unsaturated polyester resins, vinyl ester resins and epoxy resins have been used in press molding of composite materials using a mold. Although unsaturated polyester resins and vinyl ester resins having a radical polymerization property have low viscosity and excel in rapid curability, there is a problem that mechanical properties such as heat resistance, strength and toughness of molded articles are relatively low. Meanwhile, although an epoxy resin makes it possible to obtain a molded article having high heat resistance, strength and toughness, a problem associated therewith is that the resin viscosity is relatively high. For this reason, it is important to lower the viscosity at the time of impregnation and molding of a resin for molding by the PCM method.

Accordingly, PTL 1 provides a one-pack thermally curable epoxy resin composition that can be cured in a short time at a low temperature and excels in storage stability, the curable epoxy resin composition including an epoxy resin including a bisphenol A epoxy resin and a urethane-modified epoxy resin, a curing agent including dicyandiamide, a first curing accelerator including 3,4-dichlorophenyl-1,1-dimethylurea, and a second curing accelerator including an a triazine ring-containing imidazole compound. However, when a compound having a urea structure such as 3,4-dichlorophenyl-1,1-dimethylurea is used as a curing accelerator, the glass transition temperature tends to decrease easily. The resultant disadvantage is that when the compound is used for the PCM method, deformation is likely to occur when the molded article is removed from the mold.

PTL 2 indicates that where tetraglycidyl amine is added, a high glass transition temperature is demonstrated. However, many glycidyl amines have poor storage stability, and the resultant disadvantage is that the viscosity of the resin composition increases, or in the worst case, the curing reaction proceeds in the production of a blend, or when the prepreg obtained by impregnating the resin is stored, and the molded article cannot be obtained.

PTL 3 discloses an epoxy resin composition for a carbon fiber-reinforced composite material using an epoxy resin and a phenoxy resin. The epoxy resin including a polynuclear body is used as the epoxy resin used herein, and the glass transition temperature can be expected to be improved along with the improvement of the crosslinking density because the polynuclear body component in the composition is increased, but since the viscosity is likely to be high, there is a disadvantage that the resin flowability at the time of molding is likely to be insufficient.

PTL 4 discloses a resin composition including 2,4-di(N,N-dimethylureido)toluene as an essential component serving as a curing accelerator. However, the disadvantage of this resin composition is that the glass transition temperature is about 140° C. with respect to the curing temperature of 150° C., and when the composition is used in the PCM method, at a molding temperature of 150° C., the molded article tends to be deformed at the time of removal from the mold.

CITATION LIST

Patent Literature

[PTL 1] Japanese Patent Application Publication No. 2014-185256
[PTL 2] Japanese Translation of PCT Application No. 2016-504472
[PTL 3] Japanese Patent Application Publication No. 2010-248479
[PTL 4] Japanese Patent No. 3985224

SUMMARY OF INVENTION

The present invention provides a resin composition for a fiber-reinforced composite material that makes it possible to improve productivity by suppressing deformation at the time of removal from a mold, in particular, in the PCM method, while achieving both rapid curing and storage stability.

As a result of studies conducted to solve the aforementioned problems, the inventors of the present invention have accomplished the present invention by using a specific blending formulation of a main ingredient, a curing agent, a curing aid, and a curing accelerator in an epoxy resin composition.

Thus, the present invention pertains to a resin composition for a fiber-reinforced composite material, comprising: an epoxy resin (A) including a phenol novolac epoxy resin and a bisphenol A epoxy resin; a phenoxy resin (B); dicyandiamide (C); an imidazole-based curing aid (D); and a phenol-based curing accelerator (E) as essential components, wherein the phenol novolac epoxy resin of the epoxy resin (A) constitutes 40 parts by mass to 75 parts by mass, the bisphenol A epoxy resin constitutes 10 parts by mass to 35 parts by mass, and the phenoxy resin (B) constitutes 5 parts by mass to 15 parts by mass in the total of 100 parts by mass of the components (A) to (E).

It is desirable that the resin composition for a fiber-reinforced composite material of the present invention satisfy any of the following conditions.

1) The phenol novolac epoxy resin is represented by a following general formula (1) and configured at a proportion of a binuclear moiety content ratio of 15% by area or less and a trinuclear moiety content ratio of 15% by area to 60% by area in measurement by gel permeation chromatography:

[C1]

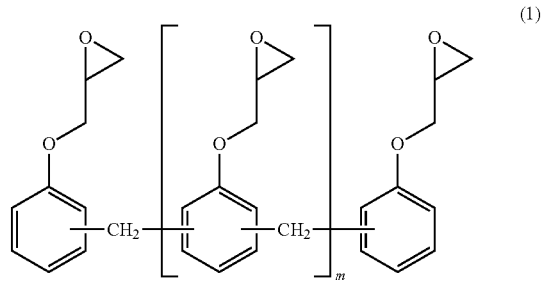

(wherein, m is an integer of 0 or more).

2) The phenoxy resin (B) is a bisphenol A epichlorohydrin epoxy resin-phenol-formaldehyde polycondensate.

3) The phenol-based curing accelerator (E) is bisphenol F having a binuclear moiety purity of 90% or more, and a blended amount thereof is 0.1 parts by mass to 1.0 part by mass with respect to 100 parts by mass of the total amount of components (A) to (E).

4) A urea compound having a structure of a following general formula (2) is not contained as a curing accelerator:

[C2]

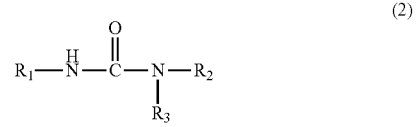

(wherein, $R_1$ is an alkyl group or an aryl group, and $R_2$ and $R_3$ independently represent an alkyl group).

5) A triazine ring structure is contained in the structure of the imidazole-based curing aid (D).

6) A minimum melt viscosity at the time of curing is 100 mPa·s to 5000 mPa·s.

Another aspect of the present invention pertains to a fiber-reinforced composite material in which reinforcing fibers are blended with the resin composition for a fiber-reinforced composite material. In this case, it is desirable that a volume content ratio of the reinforcing fibers be 30% to 75%.

Another aspect of the present invention pertains to a molded body obtained by molding and curing the fiber-reinforced composite material by a prepreg compression molding method.

The resin composition for a fiber-reinforced composite material according to the present invention has a low viscosity in the impregnation step and a small increase in viscosity with heating, thereby ensuring satisfactory impregnability into the reinforcing fibers, rapid curability, and excellent storage stability and making it possible to obtain a molded article having a high tensile elongation at the time of curing.

DESCRIPTION OF EMBODIMENTS

Embodiments of the present invention will be described hereinbelow in detail.

The resin composition for a fiber-reinforced composite material of the present invention comprises: an epoxy resin (A); a phenoxy resin (B); dicyandiamide (C); an imidazole-based curing aid (D); and a phenol-based curing accelerator (E) as essential components. Hereinafter, the epoxy resin (A), the phenoxy resin (B), dicyandiamide (C), the imidazole-based curing aid (D) having a triazine ring, and the phenol-based curing accelerator (E) will be referred to as component (A), component (B), component (C), component (D), and component (E), respectively.

The epoxy resin (A) used in the present invention is preferably such that 40 parts by mass to 75 parts by mass, preferably 40 parts by mass to 70 parts by mass, and even more preferably 50 parts by mass to 70 parts by mass in the total of 100 parts by mass of the components (A) to (E) is a phenol novolac epoxy resin, and such that the phenol novolac epoxy resin is represented by the general formula (1) hereinabove and configured at a proportion of a binuclear moiety content ratio of 15% by area or less and a trinuclear moiety content ratio of 15% by area to 60% by area in measurement by gel permeation chromatography (GPC). Here, the binuclear moiety means a component with m=0 in the general formula (1), and the trinuclear moiety means a component with m=1 in the general formula (1). Where the content ratio of the binuclear moiety exceeds 15% by area or the content ratio of the trinuclear moiety is less than 15% by area, the crosslinking density is lowered and the glass transition temperature tends to be lowered. Further, where 60% by area is exceeded, the viscosity increases, so that stable impregnability into the fibers is impaired. It is preferable that the content ratio of tetranuclear and higher polynuclear moiety be 60 area % or less.

Further, the epoxy resin (A) used in the present invention is preferably such that 10 parts by mass to 35 parts by mass, and preferably 15 parts by mass to 30 parts by mass in the total of 100 parts by mass of the components (A) to (E) is a bisphenol A epoxy resin. A liquid bisphenol A epoxy resin can be suitably used. The epoxy equivalent thereof is preferably 180 g/eq to 230 g/eq, and the viscosity is preferably 700 mPa·s to 17,000 mPa·s, and more preferably 5000 mPa·s to 15,000 mPa·s.

Where the amount of the bisphenol A epoxy resin is less than 10 parts by mass, the amount of the liquid component is reduced at normal temperature, the viscosity is likely to be high, and the impregnability into the fibers may be impaired. Where the amount is more than 35 parts by mass, the viscosity is too low and resin leakage is likely to occur during molding, and at the same time, the crosslinking density is lowered to lower the glass transition temperature, and the molded article is likely to be deformed at the time of removal from the mold.

The epoxy resin (A) used in the present invention may include other epoxy resin as long as the amount thereof is less than 15 parts by mass in 100 parts by mass of the component (A). Examples of the other epoxy resin include bisphenol epoxy resins having two epoxy groups in a molecule, such as bisphenol E epoxy resin, bisphenol S epoxy resin, bisphenol Z epoxy resin, isophorone bisphenol epoxy resin, and the like; halogen or alkyl substitution and hydrogenation products of these bisphenols, high molecular-weight materials having not only monomers but also a plurality of repeating units, and glycidyl ethers of alkylene oxide adducts of these bisphenol epoxy resins; novolac epoxy resins such as phenol novolac epoxy resin, cresol novolac epoxy resin, bisphenol A novolac epoxy resin, and the like; alicyclic epoxy resins such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, 1-epoxyethyl-3,4-epoxycyclohexane, and the like; aliphatic epoxy resins such as trimethylolpropane polyglycidyl ether, pentaerythritol polyglycidyl ether, polyoxyalkylene diglycidyl ether, and the like; glycidyl esters such as phthalic acid diglycidyl ester, tetrahydrophthalic acid diglycidyl ester, dimer acid glycidyl ester, and the like; glycidyl amines such as tetraglycidyl diamino diphenyl methane, tetraglycidyl diamino diphenyl sulfone, triglycidyl aminophenol, triglycidyl aminocresol, tetraglycidyl xylylene diamine and the like. Among these epoxy resins, from the viewpoint of suppressing a viscosity increase ratio, an epoxy resin having two epoxy groups in a molecule is preferable, and a polyfunctional epoxy resin is not preferable. These resins may be used singly or in combination of two or more types thereof.

The resin composition for a fiber-reinforced composite material of the present invention includes the phenoxy resin (B) for the purpose of adjusting the viscosity. The epoxy equivalent of the phenoxy resin (B) is, for example, 3000 g/eq to 30,000 g/eq, and the phenoxy resin (B) may be blended at 5 parts by mass to 15 parts by mass, and preferably 7 parts by mass to 13 parts by mass in the total of 100 parts by mass of the components (A) to (E).

The phenoxy resin (B) is not particularly limited, and examples thereof include phenoxy resins having a bisphenol skeleton such as bisphenol A phenoxy resin, bisphenol F phenoxy resin, bisphenol A-F mixed phenoxy resin (including a polycondensate of bisphenol A epichlorohydrin type epoxy resin and phenol formaldehyde) and the like, and also phenoxy resins having a naphthalene skeleton, phenoxy resins having a biphenyl skeleton, and the like. Commercially available products of bisphenol A phenoxy resin include YP-50, YP-50S, and YP-55U (manufactured by Nippon Steel & Sumikin Chemical Co., Ltd.). Commercially available products of bisphenol F phenoxy resin include FX-316 (manufactured by Nippon Steel & Sumikin Chemical Co., Ltd.). Commercially available products of bisphenol A-F mixed phenoxy resin include YP-70 and ZX-1356-2 (manufactured by Nippon Steel & Sumikin Chemical Co., Ltd.). Among them, it is preferable to use a bisphenol A-F mixed phenoxy resin because such resin exhibits excellent compatibility with the epoxy resin (A) and a viscosity such that makes the resin easy to handle as a resin for a prepreg.

In the resin composition for a fiber-reinforced composite material of the present invention, dicyandiamide (C) is used as a curing agent. Dicyandiamide is a curing agent which is solid at normal temperature and hardly soluble in an epoxy resin at room temperature, but is a latent curing agent excellent in storage stability at room temperature which dissolves and reacts with an epoxy group when heated to 180° C. or higher. The amount to be used is preferably in the range of 0.2 eq. to 0.8 eq. (dicyandiamide is calculated as a tetrafunctional curing agent) with respect to the epoxy equivalent of the epoxy resin (A). Where the amount is less than 0.2 eq. with respect to the epoxy equivalent, the crosslinking density of the cured product is low and the glass transition temperature tends to be low, but where the amount exceeds 0.8 eq., unreacted dicyandiamide tends to remain, so the mechanical properties are likely to degrade.

The blended amount of the imidazole-based curing aid (D) contained in the resin composition for a fiber-reinforced composite material of the present invention is 50 parts by mass to 250 parts by mass, and preferably 50 parts by mass to 100 parts by mass with respect to 100 parts by mass of dicyandiamide (C). When the amount of the imidazole-based curing accelerator is less than 50 parts by mass, expression of rapid curability tends to become hard, whereas the amount exceeds 250 parts by mass, a cured product tends to be brittle, although rapid curability is maintained.

As the imidazole-based curing aid (D), an imidazole-based compound such as 2-methylimidazole, 1,2-dimethylimidazole, 2-ethyl-4-methylimidazole, 1-benzyl-2-methylimidazole, 2-undecylimidazole, 2-heptadecylimidazole, 2-phenylimidazole, 2-phenyl-4-methylimidazole, 2-phenyl-4',5'-dihydroxymethylimidazole, 1-cyanoethyl-2-ethyl-4-methylimidazole, and the like may be used in order to obtain even better heat resistance at the time of curing, in addition to the impregnability into the reinforcing fibers at the time of mixing and suppression of viscosity increase ratio in the present invention. Furthermore, imidazole compounds including a triazine ring are preferable, and examples of such compounds include 2,4-diamino-6-[2'-methylimidazolyl-(1')]-ethyl-s-triazine, 2,4-diamino-6-[2'-ethyl-4'-methylimidazolyl-(1')]-ethyl-s-triazine, 2,4-diamino-6-[2'-undecylimidazolyl-(1')]-ethyl-s-triazine and the like. Among them, 2,4-diamino-6-[2'-methylimidazolyl-(1')]-ethyl-s-triazine can be suitably used from the viewpoint of being able to be cured in a short time. The imidazole compounds including a triazine ring may be used singly or in combination of two or more types thereof.

As the phenol-based curing accelerator (E), for example, the following phenol compounds can be used to control the reactivity at the time of curing and the stability at the time of storage in the present invention. Compounds such as catechol, 4-t-butyl catechol, pyrogallol, resorcinol, hydroquinone, phloroglucinol, bisphenol A, bisphenol F, dihydroxybiphenyl, dihydroxynaphthalene, 1,1,1-tris(4-hydroxyphenyl)ethane, bis(4-hydroxyphenyl)sulfone and the like, phenol resins of novolac type or resol type and phenol polymers such as polyvinyl phenol. Among them, bisphenol F is preferable, and the purity (binuclear moiety content ratio) thereof is preferably 90% or more.

The blended amount of the phenol-based curing accelerator (E) is 0.01 parts by mass to 10 parts by mass, and preferably 0.1 parts by mass to 3.0 parts by mass, based on 100 parts by mass of the entire resin composition. By including the curing accelerator in this range, storage stability at the time of prepreg preparation is secured, and at the same time, curing acceleration at the time of curing is exhibited, and it becomes possible to shorten the curing time.

The present invention is also characterized in that the urea-based curing accelerator of the above formula (2), which is generally used as a curing accelerator, is not included. It is generally known that this urea-based curing accelerator has the effect of starting the reaction at about 140° C., which is lower than the normal curing temperature of 180° C., when the curing accelerator is blended together with dicyandiamide as the curing agent. However, although the urea-based curing accelerator can lower the curing temperature, such curing accelerator is unlikely to be incorporated during the curing reaction and, therefore, the glass transition temperature is likely to be decreased. In the present invention, by not using the urea-based curing accelerator, it is possible to increase the glass transition temperature over that of the conventional resin compositions for fiber-reinforced composite materials.

The resin composition for a fiber-reinforced composite material of the present invention may further include a stabilizer, a modifier and the like as other components. As a preferable stabilizer, a boric acid compound represented by $B(OR)_3$ (wherein R represents a hydrogen atom, an alkyl group or an aryl group) is preferable. The blended amount of the boric acid compound is 0.01 parts by mass to 10 parts by mass, and preferably 0.1 parts by mass to 3 parts by mass, with respect to 100 parts by mass of the entire resin composition. Where the addition amount is less than 0.01 parts by mass, the stability at the time of storage cannot be secured, and where the addition amount exceeds 10 parts by mass, the effect of inhibiting the curing reaction becomes larger, and curing defects are induced, which is undesirable.

An antifoaming agent and a leveling agent can be added as additives to the resin composition for a fiber-reinforced composite material of the present invention for the purpose of improving surface smoothness. These additives can be blended in an amount of 0.01 parts by mass to 3 parts by mass, and preferably 0.01 parts by mass to 1 part by mass, with respect to 100 parts by mass of the entire resin composition. Where the blended amount is less than 0.01 parts by mass, the effect of smoothing the surface is not exhibited, and where the blended amount exceeds 3 parts by mass, the additive bleeds out to the surface, thereby conversely causing an undesirable loss of smoothness.

The resin composition for a fiber-reinforced composite material of the present invention is produced by uniformly mixing the components (A) to (E) and the like described above. The obtained resin composition for a fiber-reinforced composite material is a semi-solid resin with low tackiness at normal temperature, but since the viscosity thereof at 90° C. when using an ICI viscometer is in the range of 1000 mPa·s to 10000 mPa·s, satisfactory impregnability into the reinforcing fibers is demonstrated and dripping of the resin from the fibers hardly occurs even after impregnation. Furthermore, the resin composition for a fiber-reinforced composite material of the present invention is stable and the viscosity thereof hardly changes at 23° C., and since the viscosity increase rate after 24 h under the conditions of a temperature of 40° C. in the air atmosphere or inert gas atmosphere is 150% or less, stable impregnability into the reinforcing fibers can be maintained at the time of prepreg production including an impregnation step performed for a long time. Therefore, since the viscosity is unlikely to increase during handing even in the PCM method, only few voids occur during curing due to the decrease in resin flowability, and a fiber-reinforced composite material excellent in surface smoothness can be obtained.

Other curable resins can also be blended with the resin composition for a fiber-reinforced composite material of the present invention. Examples of such curable resins include unsaturated polyester resins, curable acrylic resins, curable amino resins, curable melamine resins, curable urea resins, curable cyanate ester resins, curable urethane resins, curable oxetane resins, curable epoxy/oxetane composite resin and the like, and these examples are not limiting.

The resin composition for a fiber-reinforced composite material of the present invention can be suitably used for a fiber-reinforced composite material obtained by the PCM method. A method for producing the prepreg used herein is not particularly limited. For example, the resin composition is heated to about 70° C. to 90° C. in advance to lower the viscosity and then coated to a predetermined thickness on release paper to prepare a sheet-shaped resin composition. The coating method used herein is also not particularly limited, and the coating can be performed with a knife coater, a reverse roll coater and the like. After the reinforcing fibers are sandwiched by the sheet-shaped resin composition obtained, a resin-impregnated prepreg can be obtained by heating and pressing with a roll or the like.

Although the method for producing a fiber-reinforced composite material from the resin composition for a fiber-reinforced composite material of the present invention is not particularly limited, in the PCM method, a predetermined molded article can be obtained in two steps, namely, a preform step of pattern cutting, laminating, and preform shaping and a press molding step of molding at high pressure and high temperature with a high-power hydraulic press.

The reinforcing fibers to be used with the resin composition for a fiber-reinforced composite material of the present invention are selected from glass fibers, aramid fibers, carbon fibers, boron fibers and the like, but in order to obtain a fiber-reinforced composite material having excellent strength, carbon fibers are preferably used.

The volume content ratio of the reinforcing fibers in the molded body constituted by the resin composition for a fiber-reinforced composite material of the present invention and the reinforcing fibers may be 30% to 75% and preferably in the range of 45% to 75%. Within this range, a molded body having few voids and a high volume content ratio of reinforcing fibers can be obtained, so that a molded material with excellent strength can be obtained.

EXAMPLES

Next, the present invention will be specifically described based on examples, but the present invention is not limited to the following examples, provided that the gist of the present invention is not impaired. Unless otherwise specified, the parts indicating the blended amount are parts by mass. The unit of epoxy equivalent is g/eq.

The content ratio of each component of the phenol novolac epoxy resin was measured using gel permeation chromatography (GPC), and the binuclear moiety content ratio and trinuclear moiety content ratio were determined from the peak area %. The measurement conditions are as follows.
Main Body: HLC-8220 GPC manufactured by Tosoh Corporation
Columns: TSKgel G4000 HXL+TSKgel G3000 HXL+TSKgel G2000 HXL manufactured by Tosoh Corporation
Column temperature: 40° C.
Eluent: tetrahydrofuran
Flow rate: 1 ml/min
Detector: RI (differential refractometer) detector The glass transition temperature was measured using a differential scanning calorimeter (Hitachi High-Tech Science DSC 7000X). The measurement was performed by raising the temperature of the resin composition from 30° C. to 280° C. at a temperature rise rate of 10° C./min, then once cooling to 30° C. and raising the temperature again to 280° C. at 10° C./min. The glass transition temperature was determined from a heat amount change at this time.

In ICI viscosity measurement, the viscosity at a predetermined temperature (90° C.) was measured using a cone-plate viscometer (Toa Industries, Ltd., CV-1S).

In the gelling time, the resin composition was placed on a hot plate at a predetermined temperature (150° C.), and stirring was continuously performed with a stirring bar. The curing reaction of the resin proceeded on the hot plate, and the point at which the resin did not become stringy and became a lump on the heat plate was taken as an end point. The gelling time was determined by measuring the time from when the resin was placed on the hot plate to the end point.

Abbreviations of the respective components used in the examples are as follows.
YD-128: bisphenol A epoxy resin (manufactured by Nippon Steel & Sumikin Chemical Co., Ltd., epoxy equivalent 187 g/eq)
YD-017: bisphenol A epoxy resin (manufactured by Nippon Steel & Sumikin Chemical Co., Ltd., epoxy equivalent 1950 g/eq)
YDPN-6300: phenol novolac epoxy resin (manufactured by Nippon Steel & Sumikin Chemical Co., Ltd.; binuclear moiety: 10% by area, trinuclear moiety: 36% by area, epoxy equivalent 173 g/eq)
YP-70: bisphenol A-F mixed epoxy resin (bisphenol A epichlorohydrin epoxy resin-phenol formaldehyde polycondensate) (manufactured by Nippon Steel & Sumikin Chemical Co., Ltd., epoxy equivalent 12,000 g/eq)
DICY: dicyandiamide (DICY ANEX 1400F, manufactured by F & F CHEMICAL)
2MZA-PW: imidazole compound (2,4-diamino-6-[2'-methylimidazolyl-(1')]-ethyl-s-triazine, manufactured by Shikoku Chemical Corporation)
BPF: phenolic curing accelerator (bisphenol F, binuclear moiety purity 97%)
BYK-322: additive (leveling agent, made by BYK JAPAN KK)

Preparation of Main Agent 1

A total of 381 g of YD-128 and 2472 g of YDPN-6300 as the epoxy resin (A) were placed in a four-neck glass separable flask equipped with a stirrer and a thermometer and heated to 130° C., then 475 g of YP-70 as the phenoxy resin (B) was charged, and the temperature was further raised to 150° C. Stirring was performed at 150° C. for 1.5 h, and after visually confirming that the particles of YP-70 disappeared, the main agent was obtained by filtration through a #100 mesh wire mesh.

Preparation of Main Agents 2 and 3

The main agents were prepared in the same manner as the main agent 1 except that the amounts of the epoxy resin A and the phenoxy resin (B) were changed to the values in Table 1.

Preparation of Curing Agent

A curing agent was obtained by stirring 503 g of DICY, 377 g of 2MZA-PW, and 1120 g of YD-128 (solvent) for 15 min at room temperature by using a planetary mixer. As for the dispersion state, uniform dispersion was confirmed with a particle gauge.

Preparation of Curing Accelerator

A total of 75 g of BPF and 225 g of YD-128 (solvent) were placed in a four-neck glass separable flask equipped with a stirrer and a thermometer, heated to 80° C., and stirred for 30 min to obtain a curing accelerator.

Example 1

A total of 380 g of the curing agent and 20 g of the curing accelerator, which were prepared in advance, 7 g of tributyl borate as a stabilizer, and 1593 g of the main agent 1 heated to 80° C. were charged into a planetary mixer and stirred under heating at 60° C. for 15 min to obtain a predetermined resin composition for a fiber-reinforced composite material.

The blending proportion (ratio) of the components recalculated by taking the whole amount as 100 parts by mass is shown in Table 2. The blending proportions of the following Examples and Comparative Examples are also shown in Tables 2 and 3 in parts by mass. Since in Comparative Examples, the blending proportions of the components differ from those in Examples, the blended amounts are also shown together with the blending proportions (ratios) in Table 3.

Examples 2 to 5

The preparation was carried out in the same manner as in Example 1 except that compositions for fiber-reinforced composite materials were prepared with the blends shown in Table 2.

Comparative Example 1

A resin composition was prepared in the same manner as in Example 1 with the blend shown in Table 3 without using dicyandiamide in the preparation of the curing agent.

Comparative Example 2

A resin composition was prepared in the same manner as in Example 1 with the blend shown in Table 3 without using 2MZA-PW, which is an imidazole, in the preparation of the curing agent.

Comparative Example 3

A resin composition was prepared in the same manner as in Example 1 with the blend shown in Table 3 by using DCMU (3-(3,4 dichlorophenyl)-1,1-dimethylurea) as the urea compound in place of imidazole in the preparation of the curing agent.

Comparative Example 4

A resin composition was prepared in the same manner as in Example 1 with the blend shown in Table 3 by using imidazole, dicyandiamide and DCMU as the urea compound in the preparation of the curing agent.

Tables 4 and 5 show the results of measurement of various physical properties of the resin compositions of Examples 1 to 5 and Comparative Examples 1 to 4.

From Table 4, in Examples 1 to 5, the glass transition temperature was 150° C. or higher, and a fast curing speed with a gelling time at 150° C. of 40 sec was demonstrated. By contrast, according to Table 5, in Comparative Example 1, although the glass transition temperature was high, the gelling time was as long as 57 sec and the fast curability was inferior. In Comparative Example 2, the gelation did not occur even after stirring at 150° C. for 30 min, and the curability was very poor. In Comparative Example 3, the gelling time was also long and the glass transition temperature was low. In Comparative Example 4, although the gelling time was relatively short, the glass transition temperature was 150° C. or less.

TABLE 1

|  |  | Epoxy equivalent (g/eq) | Main agent 1 (g) | Main agent 2 (g) | Main agent 3 (g) |
|---|---|---|---|---|---|
| Epoxy resin (A) | YD-128 | 187 | 229 | 249 | 170 |
|  | YDPN-6300 | 173 | 1486 | 1488 | 1544 |
|  | YD-017 | 1950 | 0 | 0 | 57 |
| Phenoxy resin (B) | YP-70 | 12000 | 286 | 263 | 229 |

TABLE 2

|  |  | Example 1 Main agent 1 | Example 2 Main agent 2 | Example 3 Main agent 3 | Example 4 Main agent 3 | Example 5 Main agent 3 |
|---|---|---|---|---|---|---|
| Epoxy resin (A) | YD-128 | 21.0 | 21.4 | 18.2 | 18.2 | 18.1 |
|  | YDPN-6300 | 59.2 | 59.1 | 61.4 | 61.5 | 61.1 |
|  | YD-017 | 0 | 0 | 2.3 | 2.3 | 2.3 |
| Phenoxy resin (B) | YP-70 | 11.4 | 10.5 | 9.1 | 9.1 | 9.1 |
| Dicyandiamide (C) | DICY | 4.8 | 4.8 | 4.8 | 4.8 | 4.8 |
| Imidazole-based curing aid (D) | 2MZA-PW | 3.6 | 3.6 | 3.6 | 3.6 | 3.6 |
| Phenol-based curing accelerator (E) | BPF | 0.2 | 0.3 | 0.2 | 0.2 | 0.2 |
| Stabilizer | Tributyl phosphate | 0.3 | 0.2 | 0.3 | 0.2 | 0.3 |
| Additive | BYK-322 | 0 | 0 | 0 | 0 | 0.5 |

TABLE 3

|  |  |  | Comparative Example 1 | Comparative Example 2 | Comparative Example 3 | Comparative Example 4 |
|---|---|---|---|---|---|---|
| Blended amount (g) | Main agent | YD-128 | 580 | 542 | 436 | 337 |
|  |  | YDPN-6300 | 960 | 948 | 916 | 886 |
|  |  | YP-70 | 288 | 284 | 274 | 266 |
|  |  | Total | 1828 | 1774 | 1626 | 1489 |
|  | Curing agent | DICY | 0 | 96 | 92 | 90 |
|  | Curing aid | 2MZA-PW | 72 | 0 | 0 | 66 |
|  | Curing accelerator | DCMU | 0 | 0 | 70 | 66 |
|  |  | YD-128 | 92 | 122 | 206 | 283 |
|  |  | Total | 164 | 218 | 368 | 505 |
|  | Stabilizer | Tributyl phosphate | 6 | 6 | 6 | 6 |
| Blending ratio (parts by | Epoxy resin (A) | YD-128 | 33.6 | 33.2 | 32.1 | 31.0 |
|  |  | YDPN-6300 | 48.0 | 47.4 | 45.8 | 44.3 |
|  |  | YD-017 | 0 | 0 | 0 | 0 |

TABLE 3-continued

|  |  |  | Comparative Example 1 | Comparative Example 2 | Comparative Example 3 | Comparative Example 4 |
|---|---|---|---|---|---|---|
| mass) | Phenoxy resin (B) | YP-70 | 14.4 | 14.2 | 13.7 | 13.3 |
|  | Dicyandiamide (C) | DICY | 0 | 4.8 | 4.6 | 4.5 |
|  | Imidazole-based curing aid (D) | 2MZA-PW | 3.6 | 0 | 0 | 3.3 |
|  | Urea-based curing accelerator | DCMU | 0 | 0 | 3.5 | 3.3 |
|  | Phenol-based curing accelerator (E) | BPF | 0 | 0 | 0 | 0 |
|  | Stabilizer | Tributyl phosphate | 0.3 | 0.3 | 0.3 | 0.3 |

TABLE 4

|  | Example 1 | Example 2 | Example 3 | Example 4 | Example 5 |
|---|---|---|---|---|---|
| ICI viscosity (mPa · s) | 4600 | 4000 | 4300 | 4000 | 4200 |
| Glass transition temperature (° C.) | 157 | 159 | 158 | 161 | 158 |
| Gelling time (sec) | 42 | 41 | 41 | 39 | 41 |

TABLE 5

|  | Comparative Example 1 | Comparative Example 2 | Comparative Example 3 | Comparative Example 4 |
|---|---|---|---|---|
| ICI viscosity (mPa · s) | 5200 | 5200 | 5100 | 5400 |
| Glass transition temperature (° C.) | 178 | 162 | 139 | 130 |
| Gelling time (sec) | 57 | 1800< | 146 | 48 |

INDUSTRIAL APPLICABILITY

The resin composition for a fiber-reinforced composite material according to the present invention has a low viscosity in the impregnation step and a small increase in viscosity with heating, thereby ensuring satisfactory impregnability into the reinforcing fibers, rapid curability, and excellent storage stability and making it possible to obtain a molded article having a high tensile elongation at the time of curing. In particular, the resin composition can be suitably used for a fiber-reinforced composite material obtained by the PCM method.

The invention claimed is:

1. A resin composition for a fiber-reinforced composite material, comprising: an epoxy resin (A) including a phenol novolac epoxy resin and a bisphenol A epoxy resin; a phenoxy resin (B); dicyandiamide (C); an imidazole-based curing aid (D); and a phenol-based curing accelerator (E) as essential components, wherein the phenol novolac epoxy resin constitutes 40 parts by mass to 75 parts by mass, the bisphenol A epoxy resin constitutes 10 parts by mass to 35 parts by mass, and the phenoxy resin (B) constitutes 5 parts by mass to 15 parts by mass in the total of 100 parts by mass of the components (A) to (E), the phenol-based curing accelerator (E) is bisphenol F having a binuclear moiety purity of 90% or more, and a blended amount thereof is 0.1 parts by mass to 1.0 part by mass per 100 parts by mass of the total amount of components (A) to (E).

2. The resin composition for a fiber-reinforced composite material according to claim 1, wherein the phenol novolac epoxy resin is represented by a following general formula (1) and configured at a proportion of a binuclear moiety content ratio of 15% by area or less and a trinuclear moiety content ratio of 15% by area to 60% by area in measurement by gel permeation chromatography:

[Chemical Formula 1]

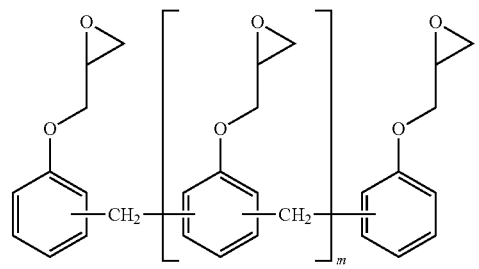

(1)

(wherein, m is an integer of 0 or more).

3. The resin composition for a fiber-reinforced composite material according to claim 2, wherein the phenoxy resin (B) is a bisphenol A epichlorohydrin epoxy resin-phenol formaldehyde polycondensate.

4. The resin composition for a fiber-reinforced composite material according to claim 2, wherein a urea compound having a structure of a following general formula (2) is not contained as a curing accelerator:

[Chemical Formula 2]

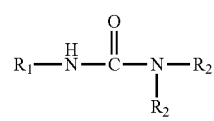

(2)

(wherein, $R_1$ is an alkyl group or an aryl group, and $R_2$ and $R_3$ independently represent an alkyl group).

5. The resin composition for a fiber-reinforced composite material according to claim 2, wherein a triazine ring structure is contained in the structure of the imidazole-based curing aid (D).

6. The resin composition for a fiber-reinforced composite material according to claim 2, wherein a minimum melt viscosity at the time of curing is 100 mPa·s to 5000 mPa·s.

7. A fiber-reinforced composite material in which reinforcing fibers are blended with the resin composition for a fiber-reinforced composite material according to claim 2.

8. The resin composition for a fiber-reinforced composite material according to claim 1, wherein the phenoxy resin (B) is a bisphenol A epichlorohydrin epoxy resin-phenol formaldehyde polycondensate.

9. The resin composition for a fiber-reinforced composite material according to claim 8, wherein a urea compound having a structure of a following general formula (2) is not contained as a curing accelerator:

[Chemical Formula 2]

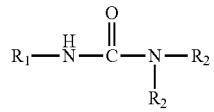
(2)

(wherein, $R_1$ is an alkyl group or an aryl group, and $R_2$ and $R_3$ independently represent an alkyl group).

10. The resin composition for a fiber-reinforced composite material according to claim 8, wherein a triazine ring structure is contained in the structure of the imidazole-based curing aid (D).

11. The resin composition for a fiber-reinforced composite material according to claim 8, wherein a minimum melt viscosity at the time of curing is 100 mPa·s to 5000 mPa·s.

12. A fiber-reinforced composite material in which reinforcing fibers are blended with the resin composition for a fiber-reinforced composite material according to claim 8.

13. The resin composition for a fiber-reinforced composite material according to claim 1, wherein a urea compound having a structure of a following general formula (2) is not contained as a curing accelerator:

[Chemical Formula 2]

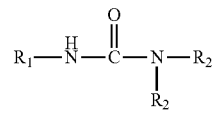
(2)

(wherein, $R_1$ is an alkyl group or an aryl group, and $R_2$ and $R_3$ independently represent an alkyl group).

14. The resin composition for a fiber-reinforced composite material according to claim 13, wherein a triazine ring structure is contained in the structure of the imidazole-based curing aid (D).

15. The resin composition for a fiber-reinforced composite material according to claim 1, wherein a triazine ring structure is contained in the structure of the imidazole-based curing aid (D).

16. The resin composition for a fiber-reinforced composite material according to claim 1, wherein a minimum melt viscosity at the time of curing is 100 mPa·s to 5000 mPa·s.

17. A fiber-reinforced composite material in which reinforcing fibers are blended with the resin composition for a fiber-reinforced composite material according to claim 1.

18. The fiber-reinforced composite material according to claim 17, wherein a volume content ratio of the reinforcing fibers is 30% to 75%.

19. A molded body obtained by molding and curing the fiber-reinforced composite material according to claim 18 by a prepreg compression molding method.

20. A molded body obtained by molding and curing the fiber-reinforced composite material according to claim 17 by a prepreg compression molding method.

* * * * *